United States Patent [19]

Yanagida et al.

[11] Patent Number: 4,605,505
[45] Date of Patent: Aug. 12, 1986

[54] DRILLING FLUIDS

[75] Inventors: Makoto Yanagida, Tokyo; Yukihiko Sekimoto, Saitama; Shoichi Kanda, Kanagawa, all of Japan

[73] Assignee: Nitto Chemical Industry Co., Ltd., Tokyo, Japan

[21] Appl. No.: 719,388

[22] Filed: Apr. 2, 1985

[30] Foreign Application Priority Data

Apr. 2, 1984 [JP] Japan ................................ 59-63407
Apr. 2, 1984 [JP] Japan ................................ 59-63410
May 22, 1984 [JP] Japan ................................ 59-101780

[51] Int. Cl.$^4$ .............................................. C09K 7/02
[52] U.S. Cl. ................................ 252/8.514; 252/8.5 A
[58] Field of Search ............ 252/8.5 A, 8.5 C, 8.55 R, 252/8.55 D; 536/88, 98

[56] References Cited

U.S. PATENT DOCUMENTS 2,425,768  8/1947  Wagner ................................ 252/8.5
4,317,759  3/1982  Kanda et al. ........................ 524/93

FOREIGN PATENT DOCUMENTS 49-27659  7/1974  Japan ................................ 524/83
289192   11/1969  U.S.S.R. ........................... 252/8.5
587144    1/1978  U.S.S.R. ........................... 252/8.5
971862   11/1982  U.S.S.R. ........................... 252/8.5

Primary Examiner—Herbert B. Guynn
Attorney, Agent, or Firm—Sughrue, Mion, Zinn, Macpeak and Seas

[57] ABSTRACT

A drilling fluid is described, consisting essentially of sodium carboxymethyl cellulose, bentonite, water, and at least one compound selected from 2-mercaptobenzimidazole compounds, 2-mercaptobenzothiazole compounds, 2-mercaptothiazoline and 2-thioimidazolidone.

4 Claims, No Drawings

DRILLING FLUIDS

FIELD OF THE INVENTION

The present invention relates to drilling fluids used in oil drilling and other well drillings. More particularly, the present invention relates to improved drilling fluids which can prevent an increase in water loss under high temperature conditions.

BACKGROUND OF THE INVENTION

In oil and gas well drillings, drilling fluids (also referred to as drilling muds) generally play an important role in keeping the drilling well stable, and enable drilling to the desired depth with safety and rapidity.

Accordingly, improper controlling of mud for the well formation develops into sources of accidents such as breaks, stuck pipes, blow outs, etc.

In general, the drilling fluids widely used up to this time are mainly composed of water-bentonite suspension and are fluids that are regulated so as to accord with the well formation by addition of dispersants, viscosifiers, colloidal protectors, water loss controllers, soluble salts, surfactants, lubricants, weighting materials, and other drilling mud additives of various kinds in accordance with the particular intended use.

It is noted that sodium carboxymethyl cellulose (CMC) tends to cover clay particles with its long chain molecules, and pluggs porosities of the mud wall, and thus has extremely excellent properties as a colloidal protector and water loss controller, and accordingly has been widely employed for the purpose of preventing the breaking of formation walls.

Accordingly, the drilling fluids with the purpose described above as the principal object are desirably fluids that are mainly composed of water, bentonite, and CMC, and further that the various mud materials are added in accordance with the particular intended use. Typical fluids are shown in Table 1.

TABLE 1

| | Examples of Drilling Fluids (parts by weight) | |
|---|---|---|
| Mud Material | Fresh Water-Bentonite Mud | Seawater-Bentonite Mud |
| fresh water | 100 | — |
| seawater | — | 100 |
| bentonite | 1–10 | 8–15 |
| CMC | 0.1–1.0 | 0.5–1.5 |
| asbestos | — | 1–2 |
| sodium hydroxide | — | 0.2–0.5 |
| sodium carbonate | — | 0.5–1 |

However, when the temperature in a well becomes higher than about 80° C., the above drilling fluids are extremely unstable and have the drawback of increasing water loss. Therefore, it has been found that when such drilling fluids are used under high temperature conditions, due to the lowering of their efficacies as described above, it becomes difficult to drill the formation, and furthermore that the break of the formation wall occurs in some cases.

SUMMARY OF THE INVENTION

As a result of extensive investigations, an improved drilling fluid which overcomes the above-described problems has now been discovered.

Thus, the present invention is directed to a drilling fluid consisting essentially of sodium carboxymethyl cellulose, bentonite, water and at least one compound selected from the group consisting of 2-mercaptobenzimidazole compounds, 2-mercaptobenzothiazole compounds, 2-mercaptothiazoline and 2-thioimidazolidone.

As is apparent from the examples described below, the drilling fluids of the present invention have extremely excellent properties in that the increase of water loss is prevented even under high temperature conditions.

DETAILED DESCRIPTION OF THE INVENTION

The drilling fluids of the present invention contain sodium carboxymethyl cellulose, bentonite, water and at least one compound selected from 2-mercaptobenzimidazole compounds, 2-mercaptobenzothiazole compounds, 2-mercaptothiazoline and 2-thioimidazolidone.

The 2-mercaptobenzimidazoles that can be contained in the drilling fluid of the present invention are preferably represented by the following formula (I)

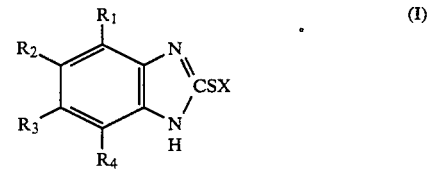

wherein each of $R_1$, $R_2$, $R_3$, and $R_4$ represents a hydrogen atom or a lower alkyl group, such as a methyl or ethyl group, and X represents a hydrogen atom, an alkali metal, or ammonium.

Of these compounds, 2-mercaptobenzimidazole ($R_1$ through $R_4$=H, and X=H), methyl-2-mercaptobenzimidazoles (wherein at least one of $R_1$ through $R_4$ is methyl group, and X=H), and sodium salts (X=Na) thereof are especially preferred.

Further preferred 2-mercaptobenzothiazole compounds that can be contained in the clear brine completion and workover fluid of the present invention are represented by the formula (II)

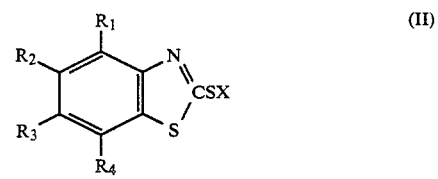

wherein each of $R_1$, $R_2$, $R_3$, and $R_4$ represents a hydrogen atom or a lower alkyl group, such as methyl or ethyl group, and X represents a hydrogen atom, an alkali metal or ammonium.

Of these compounds, 2-mercaptobenzothiazole (wherein $R_1$ through $R_4$=H, and X=H), methyl-2-mercaptobenzothiazoles (wherein at least one of $R_1$ through $R_4$ is a methyl group, and X=H) and sodium salts (X=Na) thereof are especially preferred.

The concentration of the at least one compound selected from 2-mercaptobenzimidazole compounds, 2-mercaptobenzothiazole compounds, 2-mercaptothiazoline and 2-thioimidazolidone contained in the drilling fluids of the present invention is preferably in the range of from about 0.001% to about 0.2% by weight, and more preferably from about 0.005% to about 0.1% by weight, based on the total weight of the drilling fluids.

The essential components used in the drilling fluid of the present invention other than the 2-mercaptobenzimidazole, 2-mercaptobenzothiazole, 2-mercaptothiazoline, and 2-thioimidazolidone compounds, i.e., sodium carboxymethyl cellulose, bentonite and water, and other drilling mud materials employed along with said components in accordance with the particular intended use, are as follow.

The content of sodium carboxymethyl cellulose, generally, has a degree of substitution of from 0.5 and 1.5 and a degree of polymerization of from 100 to 1,500, and is contained in the drilling fluids of the present invention in an amount of from about 0.1% to about 1.5% by weight.

The bentonite comes up to the standards of API (American Petroleum Institute) and is contained in the drilling fluids of the present invention in an amount of from about 1% to about 15% by weight.

In general, river water, formation water, seawater, and the like can be employed as the water component of the drilling fluid, and they are contained in the drilling fluids of the present invention in a ratio of from about 25% to about 99% by weight.

Dispersants, viscosifiers, coloidal protectors, water loss controllers, soluble salts, surfactants, lubricants, weighting materials, clays, and the like generally can be employed as additional drilling mud components if desired. They are used in accordance with the using purpose, and are contained in the drilling fluids of the present invention in a total amount of about 75% by weight or less.

When the drilling fluids of the present invention have bee stored at a high temperature of about 80° C. or more, and preferably at from about 80° C. to about 150° C., they are superior to those heretofore in use, particularly in that water loss is extremely small.

The present invention is described below by way of examples. The drilling fluids more stored in a Roller Oven at a high temperature and then cooled to room temperature. The drilling fluids of the present invention and those heretofore in use were measured and compared regarding to their water losses and fluid properties in the examples below.

Also, water loss (WL) was measured by using of Filter Press according to the standards of API (American Petroleum Institute), and fluid properties [Apparent Viscosity (AV), Plastic Viscosity (PV), Yield Point (YP) and Gel Strength (GEL)] were measured using a Fann VG meter Model 35.

In the examples below, all expressions of "parts" are parts by weight, unless otherwise indicated.

EXAMPLE 1

A drilling fluid of the type heretofore in use was composed of 100 parts of fresh water, 2 parts of bentonite, and 0.25 parts of sodium carboxymethyl cellulose having a degree of substitution of 0.8 and a viscosity of 1,200 cp (centipoise) at 1% by weight (Brookfield Viscometer, No. 3 Spindle, 30 RPM, 25° C.), and the drilling fluid of the present invention was prepared by an addition of 0.005 parts of 2-mercaptobenzimidazole to the above fluid. Each of them was stored in a Roller Oven for 16 hours at 80° C., and then cooled to room temperature. Their water losses and fluid properties were measured. The results obtained are shown in Table 2.

TABLE 2

| Drilling Fluid | AV (CP) | PV (CP) | YP (1b/100 ft$^2$) | GEL (1b/100 ft$^2$) | WL (CC) |
|---|---|---|---|---|---|
| Fluid heretofore in use | 11.5 | 9.5 | 3.5 | 1–2 | 16.4 |
| Fluid of the present invention | 18 | 13 | 10 | 2–6 | 10.6 |

EXAMPLE 2

A drilling fluid of the type heretofore in use was composed of 100 parts of seawater, 0.5 parts of sodium carbonate, 0.3 parts of sodium hydroxide, 8 parts of bentonite, 1 part of asbestos, and 1 part of sodium carboxymethyl cellulose having a degree of substitution of 0.8 and a viscosity of 20 cp at 1% by weight (Brookfield Viscometer, No. 1 Spindle, 60 RPM, 25° C.), and the drilling fluid of the present invention was prepared by an addition of 0.05 parts of the sodium salt of 2-mercaptobenzimidazole to the above fluid. Each of them was stored in a Roller Oven for 16 hours at 140° C., and then cooled to room temperature. Their water losses and fluid properties were measured. The results obtained are shown in Table 3.

TABLE 3

| Drilling Fluid | AV (CP) | PV (CP) | YP (1b/100 ft$^2$) | GEL (1b/100 ft$^2$) | WL (CC) |
|---|---|---|---|---|---|
| Fluid heretofore in use | 7 | 4 | 6 | 3–4 | 23.3 |
| Fluid of the present invention | 9 | 6 | 6 | 3–6 | 16.2 |

EXAMPLE 3

A drilling fluid of the type heretofore in use was composed of 100 parts of seawater, 0.5 parts of sodium carbonate, 0.3 parts of sodium hydroxide, 8 parts of bentonite, 1 part of asbestos, and 0.8 parts of sodium carboxymethyl cellulose having a degree of substitution of 1.2 and a viscosity of 50 cp at 1% by weight (Brookfield Viscometer, No. 1 Spindle, 60 RPM, 25° C.), and the drilling fluid of the present invention was prepared by an addition of 0.02 parts of the sodium salt of 2-mercaptobenzimidazole to the above fluid. Each of them was stored in a Roller Oven for 16 hours at 140° C. and then cooled to room temperature. Their water losses and fluid properties were measured. The results obtained are shown in Table 4.

TABLE 4

| Drilling Fluid | AV (CP) | PV (CP) | YP (1b/100 ft$^2$) | GEL (1b/100 ft$^2$) | WL (CC) |
|---|---|---|---|---|---|
| Fluid heretofore in use | 7 | 5.5 | 3 | 2–4 | 32.1 |
| Fluid of the present invention | 8 | 6 | 3.5 | 2–5 | 15.8 |

EXAMPLE 4

A drilling fluid of the type heretofore in use was composed of 100 parts of fresh water, 2 parts of bentonite, 0.25 parts of sodium carboxymethyl cellulose, which was the same as that used in Example 1, and the drilling fluid of the present invention was prepared by an addition of 0.005 parts of 2-mercaptothiazoline to the above fluid. Each of them was stored in a Roller Oven for 16 hours at 80° C. and then cooled to room temperature. Their water losses and fluid properties were measured. The results obtained are shown in Table 5.

TABLE 5

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 11.5 | 9.5 | 3.5 | 1–2 | 16.4 |
| Fluid of the present invention | 16.5 | 12 | 9 | 2–7 | 11.0 |

EXAMPLE 5

A drilling fluid of the type heretofore in use is composed of 100 parts of seawater, 0.5 parts of sodium carbonate, 0.3 parts of sodium hydroxide, 8 parts of bentonite, 1 part of asbestos, and 1 part of sodium carboxymethyl cellulose, which was the same as that used in Example 2, and the drilling fluid of the present invention was prepared by addition of 0.05 parts of 2-mercaptothiazoline to the above fluid. Each of them was stored in a Roller Oven for 16 hours at 140° C. and then cooled to room temperature. Their water losses and fluid properties were measured. The results obtained are shown in Table 6.

TABLE 6

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 4 | 6 | 3–4 | 23.3 |
| Fluid of the present invention | 8.5 | 5.5 | 6 | 3–7 | 17.4 |

EXAMPLE 6

A drilling fluid of the type heretofore in use was composed of 100 parts of seawater, 0.5 parts of sodium carbonate, 0.3 parts of sodium hydroxide, 8 parts of bentonite, 1 part of asbestos and 0.8 parts of sodium carboxymethyl cellulose, which was the same as that used in Example 3, and the drilling fluid of the present invention was prepared by an addition of 0.02 parts of 2-mercaptothiazoline to the above fluid. Each of them was stored in a Roller Oven for 16 hours at 140° C. and then cooled to room temperature. Their water losses and fluid properties were measured. The results obtained are shown in Table 7.

TABLE 7

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 5.5 | 3 | 2–4 | 32.1 |
| Fluid of the present invention | 7 | 5.5 | 3 | 2–4 | 16.9 |

EXAMPLE 7

A drilling fluid of the type heretofore in use was composed of 100 parts of fresh water, 2 parts of bentonite and 0.25 parts of sodium carboxymethyl cellulose, which was the same as that used in Example 1, and the drilling fluid of the present invention was prepared by an addition of 0.004 parts of 2-thioimidazolidone to the above fluid. Each of them was stored in a Roller Oven for 16 hours at 80° C. and then cooled to room temperature. Their water losses and fluid properties were measured. The results obtained are shown in Table 8.

TABLE 8

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 11.5 | 9.5 | 3.5 | 1–2 | 16.4 |
| Fluid of the present invention | 17.0 | 12.5 | 9.5 | 2–7 | 10.6 |

EXAMPLE 8

A drilling fluid of the type heretofore in use was composed of 100 parts of seawater, 0.5 parts of sodium carbonate, 0.3 parts of sodium hydroxide, 8 parts of bentonite, 1 part of asbestos, and 1 part of sodium carboxymethyl cellulose which was the same as that used in Example 2, and the drilling fluid of the present invention was prepared by an addition of 0.06 parts of 2-thioimidazolidone to the above fluid. Each of them was stored in a Roller Oven for 16 hours at 140° C. and then cooled to room temperature. Their water losses and fluid properties were measured. The results obtained are shown in Table 9.

TABLE 9

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 4 | 6 | 3–4 | 23.3 |
| Fluid of the present invention | 8.5 | 5.5 | 6 | 3–8 | 16.6 |

EXAMPLE 9

A drilling fluid of the type heretofore in use was composed of 100 parts of seawater, 0.5 parts of sodium carbonate, 0.3 parts of sodium hydroxide, 8 parts of bentonite, 1 part of asbestos, and 0.8 parts of sodium carboxymethyl cellulose, which was the same as that used in Example 3, and the drilling fluid of the present invention was prepared by an addition of 0.025 parts of 2-thioimidazolidone to the above fluid. Each of them was stored in a Roller Oven for 16 hours at 140° C. and then cooled to room temperature. Their water losses and fluid properties were measured. The results obtained are shown in Table 10.

TABLE 10

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 5.5 | 3 | 2–4 | 32.1 |
| Fluid of the present invention | 8 | 5.5 | 4 | 2–5 | 15.6 |

EXAMPLE 10

A drilling fluid of the type heretofore in use was composed of 100 parts of fresh water, 2 parts of bentonite and 0.25 parts of sodium carboxymethyl cellulose, which was the same as that used in Example 1, and the drilling fluid of the present invention was prepared by an addition of 0.007 parts of 2-mercaptobenzothiazole to the above fluid. Each of them was stored in a Roller Oven for 16 hours at 80° C. and then cooled to room temperature. Their water losses and fluid properties were measured. The results obtained are shown in Table 11.

TABLE 11

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 11.5 | 9.5 | 3.5 | 1–2 | 16.4 |
| Fluid of the present invention | 17 | 12 | 9.5 | 2–5 | 11.3 |

EXAMPLE 11

A drilling fluid of the type heretofore in use is composed of 100 parts of seawater, 0.5 parts of sodium carbonate, 0.3 parts of sodium hydroxide, 8 parts of bentonite, 1 part of asbestos, and 1 part of sodium carboxymethyl cellulose, which was the same as that used in Example 2, and the drilling fluid of the present invention was prepared by an addition of 0.07 parts of the sodium salts of 2-mercaptobenzothiazole to the above fluid. Each of them was stored in a Roller Oven for 16 hours at 140° C. and then cooled to room temperature. Their water losses and fluid properties were measured. The results obtained are shown in Table 12.

TABLE 12

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 4 | 6 | 3–4 | 23.3 |
| Fluid of the present invention | 7.5 | 5 | 3 | 3–5 | 18.1 |

EXAMPLE 12

A drilling fluid of the type heretofore in use was composed of 100 parts of seawater, 0.5 parts of sodium carbonate, 0.3 parts of sodium hydroxide, 8 parts of bentonite, 1 part of asbestos and 0.8 parts of sodium carboxymethyl cellulose, which was the same as that used in Example 3, and the drilling fluid of the present invention was prepared by an addition of 0.03 parts of the sodium salt of 2-mercaptobenzothiazole to the above fluid. Each of them was stored in a Roller Oven for 16 hours at 140° C. and then cooled to room temperature. Their water losses and fluid properties were measured. The results obtained are shown in Table 13.

TABLE 13

| Drilling Fluid | AV (CP) | PV (CP) | YP (lb/100 ft²) | GEL (lb/100 ft²) | WL (CC) |
| --- | --- | --- | --- | --- | --- |
| Fluid heretofore in use | 7 | 5.5 | 3 | 2–4 | 32.1 |
| Fluid of the present invention | 9 | 6 | 4 | 2–5 | 16.0 |

As can be see from the examples above, it is clearly demonstrated that, after storing of the drilling fluids, the water loss of the drilling fluids of the present invention is extremely small as compared with the water loss of drilling fluids heretofore in use.

While the invention has been described in detail and with reference to specific embodiments thereof, it will be apparent to one skilled in the art that various changes and modifications can be made therein without departing from the spirit and scope thereof.

What is claimed is:

1. A drilling fluid consisting essentially of sodium carboxymethyl cellulose present at a water loss controller, bentonite, water, and at least one compound selected from the group consisting of 2-mercaptobenzimidazole compounds, 2-mercaptobenzothiazole compounds, 2-mercaptothiazoline and 2-thioimidazolidone, wherein the 2-mercaptobenzimidazole compounds are represented by the formula (I):

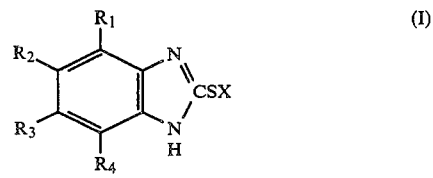

wherein each of $R_1$, $R_2$, $R_3$, and $R_4$ represents a hydrogen atom or a lower alkyl group, and X represents a hydrogen atom, an alkali metal, or ammonium, and the 2-mercaptobenzothiazole compounds are represented by the formula (II)

wherein each of $R_1$, $R_2$, $R_3$, and $R_4$ represents a hydrogen atom or a lower alkyl group, and X represents a hydrogen atom, an alkali metal, or ammonium, and the concentration of said compounds contained in the drilling fluid is from about 0.001% to about 0.2% by weight, based on the total weight of drilling fluid.

2. A drilling fluid as in claim 1, wherein each of $R_1$, $R_2$, $R_3$, $R_4$, represents a hydrogen atom or a methyl group and X represents a hydrogen atom or sodium.

3. A drilling fluid as in claim 1, wherein each of $R_1$, $R_2$, $R_3$, $R_4$, represents a hydrogen atom or a methyl group and X represents a hydrogen atom or sodium.

4. A drilling fluid as in claim 1, wherein the concentration of said compound(s) contained in the drilling fluid is from about 0.005% to about 0.1% by weight, based on the total weight of the drilling fluid.

* * * * *

UNITED STATES PATENT AND TRADEMARK OFFICE
CERTIFICATE OF CORRECTION

PATENT NO. : 4,605,505
DATED : August 12, 1986
INVENTOR(S) : Makoto Yanagita et al It is certified that error appears in the above-identified patent and that said Letters Patent is hereby corrected as shown below:

On the cover page, in the line beginning with "[75] Inventors:" please delete "Yanagida" and insert therefor --Yanagita--.

Signed and Sealed this

Eighteenth Day of November, 1986

Attest:

DONALD J. QUIGG

Attesting Officer

Commissioner of Patents and Trademarks